(12) United States Patent
Mora et al.

(10) Patent No.: US 8,589,604 B2
(45) Date of Patent: Nov. 19, 2013

(54) INCREASED SPEED OF PROCESSING OF DATA RECEIVED OVER A COMMUNICATIONS LINK

(71) Applicant: Apple Inc., Cupertino, CA (US)

(72) Inventors: Matthew Xavier Mora, Fremont, CA (US); Niel D. Warren, Soquel, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 13/717,505

(22) Filed: Dec. 17, 2012

(65) Prior Publication Data

US 2013/0184842 A1 Jul. 18, 2013

Related U.S. Application Data

(63) Continuation of application No. 13/252,106, filed on Oct. 3, 2011, now Pat. No. 8,335,874, which is a continuation of application No. 11/279,866, filed on Apr. 14, 2006, now Pat. No. 8,032,672.

(51) Int. Cl.
*G06F 3/00* (2006.01)
*G06F 5/00* (2006.01)

(52) U.S. Cl.
USPC .................. 710/52; 700/94; 709/234

(58) Field of Classification Search
None
See application file for complete search history.

(56) References Cited

U.S. PATENT DOCUMENTS

| | | |
|---|---|---|
| 5,434,913 A | 7/1995 | Tung et al. |
| 5,508,942 A | 4/1996 | Agarwal |
| 5,544,161 A | 8/1996 | Bigham et al. |
| 5,563,892 A | 10/1996 | Kostreski et al. |
| 5,650,994 A | 7/1997 | Daley |
| 5,661,518 A | 8/1997 | Palm et al. |
| 5,666,293 A | 9/1997 | Metz et al. |
| 5,677,905 A | 10/1997 | Bigham et al. |
| 5,708,659 A | 1/1998 | Rostoker et al. |
| 5,729,549 A | 3/1998 | Kostreski et al. |
| 5,729,825 A | 3/1998 | Kostreski et al. |
| 5,734,589 A | 3/1998 | Kostreski et al. |
| 5,751,707 A | 5/1998 | Voit et al. |
| 5,784,683 A | 7/1998 | Sistanizadeh et al. |
| 5,815,583 A | 9/1998 | Solomon et al. |
| 5,847,771 A | 12/1998 | Cloutier et al. |
| 5,887,187 A | 3/1999 | Rostoker et al. |
| 5,949,891 A | 9/1999 | Wagner et al. |
| 5,951,664 A | 9/1999 | Lambrecht |
| 5,973,684 A | 10/1999 | Brooks et al. |

(Continued)

FOREIGN PATENT DOCUMENTS

| | | |
|---|---|---|
| WO | WO2006/039051 | 4/2006 |
| WO | WO2007/002551 | 1/2007 |
| WO | WO2007/078958 | 7/2007 |

*Primary Examiner* — Henry Tsai
*Assistant Examiner* — Michael Sun
(74) *Attorney, Agent, or Firm* — Gazdzinski & Associates, PC

(57) ABSTRACT

A method and apparatus for processing data samples utilizes a channel map populated by device descriptor, or by an application program interface. Packet processing code loops through all of the samples contained in a packet while incrementing through a channel map and steering table without having to look up a table to determine in what audio buffer the sample is to be stored or read. Additionally, the present invention utilizes a stride map, so the audio subsystem knows how many samples to skip in order to reach the next sample frame. The present invention can be used for handling received packets as well as forming packets to send over a bus.

24 Claims, 4 Drawing Sheets

(56) References Cited

U.S. PATENT DOCUMENTS

| | | | |
|---|---|---|---|
| 6,016,401 A | 1/2000 | Rostoker et al. | |
| 6,125,398 A | 9/2000 | Mirashrafi et al. | |
| 6,185,396 B1 | 2/2001 | Aizawa et al. | |
| 6,188,699 B1 * | 2/2001 | Lang et al. | 370/463 |
| 6,215,748 B1 | 4/2001 | Greenwood et al. | |
| 6,226,441 B1 * | 5/2001 | Hartung et al. | 386/314 |
| 6,292,844 B1 | 9/2001 | Smyers | |
| 6,373,954 B1 | 4/2002 | Malcolm et al. | |
| 6,611,537 B1 | 8/2003 | Edens et al. | |
| 6,628,999 B1 | 9/2003 | Klaas et al. | |
| 6,640,044 B2 | 10/2003 | Greenwood et al. | |
| 6,640,147 B1 | 10/2003 | Duvall et al. | |
| 6,665,749 B1 | 12/2003 | Ansari | |
| 6,690,428 B1 | 2/2004 | Hudelson et al. | |
| 6,760,772 B2 | 7/2004 | Zou et al. | |
| 6,850,496 B1 | 2/2005 | Knappe et al. | |
| 6,948,030 B1 | 9/2005 | Gupta et al. | |
| 7,274,862 B2 | 9/2007 | Komori | |
| 7,349,391 B2 | 3/2008 | Ben-Dor et al. | |
| 7,464,394 B1 | 12/2008 | Gordon et al. | |
| 7,672,743 B2 | 3/2010 | Messer et al. | |
| 7,831,127 B2 | 11/2010 | Wilkinson | |
| 2002/0015401 A1 | 2/2002 | Subramanian et al. | |
| 2002/0031120 A1 | 3/2002 | Rakib | |
| 2002/0169902 A1 | 11/2002 | Horiuchi et al. | |
| 2002/0178449 A1 | 11/2002 | Yamamoto et al. | |
| 2003/0215218 A1 | 11/2003 | Chang | |
| 2003/0223733 A1 | 12/2003 | Chang | |
| 2004/0049379 A1 | 3/2004 | Thumpudi et al. | |
| 2004/0174835 A1 | 9/2004 | Godwin et al. | |
| 2005/0021885 A1 | 1/2005 | Anderson | |
| 2005/0117601 A1 | 6/2005 | Anderson | |
| 2005/0120079 A1 | 6/2005 | Anderson | |
| 2005/0125840 A1 | 6/2005 | Anderson | |
| 2005/0135390 A1 | 6/2005 | Anderson | |
| 2005/0160453 A1 | 7/2005 | Kim | |
| 2005/0213593 A1 | 9/2005 | Anderson | |
| 2005/0262537 A1 | 11/2005 | Baran et al. | |
| 2006/0034326 A1 | 2/2006 | Anderson | |
| 2006/0241796 A1 | 10/2006 | Messer et al. | |
| 2006/0253656 A1 | 11/2006 | Donawa et al. | |
| 2007/0105631 A1 | 5/2007 | Herr et al. | |
| 2007/0126747 A1 | 6/2007 | Wu | |
| 2007/0153774 A1 | 7/2007 | Shay et al. | |
| 2008/0134864 A1 | 6/2008 | Puryear | |
| 2010/0046383 A1 | 2/2010 | Williams et al. | |
| 2010/0157950 A1 * | 6/2010 | Ozluturk et al. | 370/335 |

\* cited by examiner

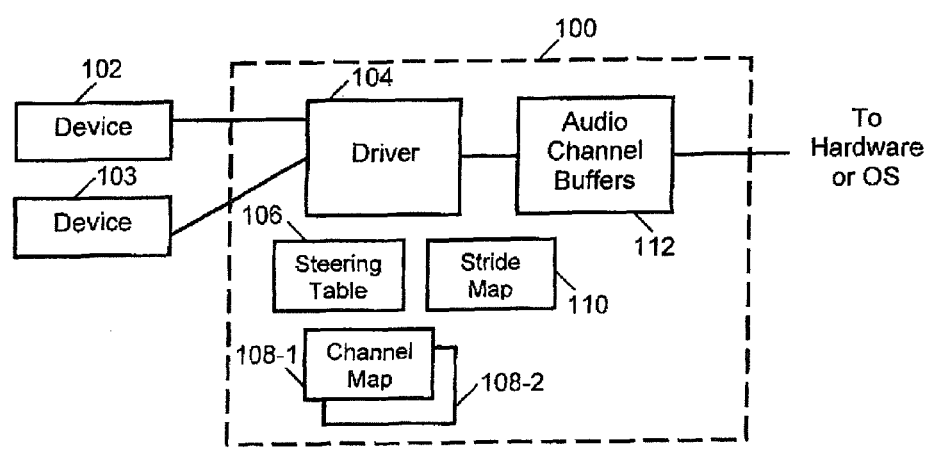
FIG. 1
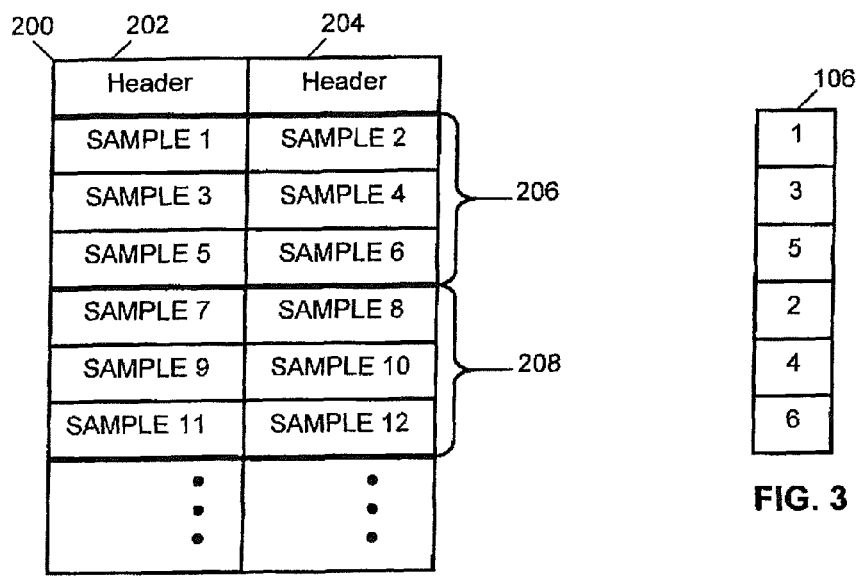
FIG. 2
FIG. 3

INCREASED SPEED OF PROCESSING OF DATA RECEIVED OVER A COMMUNICATIONS LINK

PRIORITY

This application is a continuation of and claims priority to co-owned U.S. patent application Ser. No. 13/252,106 filed Oct. 3, 2011 and entitled "INCREASED SPEED OF PROCESSING OF DATA RECEIVED OVER A COMMUNICATIONS LINK (issuing as U.S. Pat. No. 8,335,874), which is a continuation of U.S. patent application Ser. No. 11/279,866 filed Apr. 14, 2006 and entitled "INCREASED SPEED OF PROCESSING OF AUDIO SAMPLES RECEIVED OVER A SERIAL COMMUNICATIONS LINK BY USE OF CHANNEL MAP AND STEERING TABLE" (now U.S. Pat. No. 8,032,672), each of the forgoing being incorporated herein by reference in its entirety.

FIELD OF THE INVENTION

The present invention relates broadly to digital audio transmitted between devices on a network. Specifically, the present invention relates to storing audio data in audio buffers in locations as determined by the contents of steering registers and channel maps.

BACKGROUND OF THE INVENTION

A data bus can be utilized for interconnecting electronic devices such as computers, audio systems, television receivers, display devices, video recorders, and home control devices such as security system or appliance control systems. Communication using a data bus occurs in accordance with a bus protocol recognized by devices attached to the bus. Examples of bus protocols include the IEEE 1394 High Performance Serial Bus and the Universal Serial Bus (USB). A bus protocol typically provides for communicating both control information and data. On an IEEE 1394 serial bus, control information is generally passed using the asynchronous services of the serial bus. Control information for a particular application can be defined using, for example, Common Application Language (CAL) or Audio-Video/Control (AVIC).

Like video processing, in audio processing applications, audio samples can be packed in the order the samples enter an audio processing engine. The order could be by stereo pairs, mono channels, interleaved channels, or whatever order the audio hardware chooses to packetize the audio data. This places a significant processing burden on the packetizer or depacketizer to determine which audio channel buffer is associated with each audio sample in the packet. The complexity is further compounded when multiple devices transmit audio data to the audio processing engine, as the different devices do not conform to a single standard or sample ordering. Rather, existing audio devices order the audio samples within the packet as efficiently as possible for themselves, and this efficiency does not necessarily apply to the target device that receives the audio packets.

While device descriptors are commonly used on the communication bus, current device descriptors can only describe the channel ordering used to insert audio samples in the packet, this only works for in-order processing. With multiple devices, there are multiple channel orderings, so there is a question as to how to handle all possible sample orderings and interleaved as well as noninterleaved buffers. As there is no current solution to this problem, the burden on the audio processing engine remains, and device performance suffers.

SUMMARY OF THE INVENTION

The present disclosure provides methods and apparatus for processing data samples. Methods and apparatus are disclosed that utilize a channel map that is populated by a modified device descriptor, or by an application program interface. In accordance with the present disclosure, low-level packet processing code loops through all of the samples contained in a packet while incrementing through a channel map and steering table without having to look up a table to determine in what audio buffer the sample is to be stored or read. This method and apparatus functions regardless of whether or not the audio buffer is interleaved or not, and regardless of how many channels are accommodated by an interleaved audio buffer. Additionally, the present disclosure utilizes a stride map, so the audio subsystem knows how many samples to skip in order to reach the next sample frame. The present disclosure can be used for handling received packets as well as forming packets to send over a bus.

In a preferred embodiment, the present disclosure encompasses software commands executed by a processor to perform the methods of the present disclosure. In another preferred embodiment, hardware is configured to execute the methods of the present disclosure.

Many other features and advantages of the present disclosure will become apparent from reading the following detailed description, when considered in conjunction with the accompanying drawings, in which:

BRIEF DESCRIPTION OF THE DRAWINGS

FIG. 1 illustrates in block diagram form functional components used in embodiments of the present invention;

FIG. 2 illustrates the format of a CIP packet used in embodiments of the present invention;

FIG. 3 illustrates a steering table used in accordance with the present invention;

DETAILED DESCRIPTION

Figure 4:
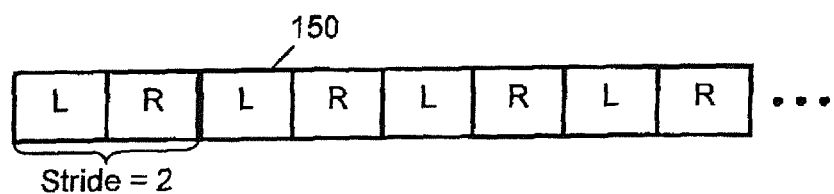
FIGS. 4 and 5 illustrate sample buffers having different stride sizes.

Directing attention to FIG. 1, there is shown a contemplated audio subsystem 100. Device 102 is in communication with driver 104 and sends driver 104 audio packets as well as control information. Driver 104 typically includes a packetizing/depacketizing engine that functions to either form packets in the case of packetization, or process received packets into audio streams in the case of depacketization. Driver 104 consults steering table 106, channel map 108 and stride map 110 to select the appropriate buffer from audio channel buffers 112. Audio buffers 112 can feed output to an operating system of the host of audio subsystem 100, or audio buffers 112 can be fed to hardware devices. Steering table 106 is a lookup table that returns an address of a sample buffer based on the channel index of the audio sample in the packet. Channel map 108 is a pointer array that contains starting addresses of individual sample buffers associated with samples in the packet. Stride map 110 is an array of step sizes for incrementing audio pointers to the next sample in the packet.

Channel map 108 can be allocated to the size of the audio packets' sampleframe width. Channel map 108 can also accommodate mismatched sample size or packet size with respect to application stream size. For example, if an audio application is only recording a stereo stream but device 102 is sending data over 24 audio channels, channel map 108 can be configured to publish only a stereo stream while still extracting a large sample frame from the packet. This increases efficiency because driver 104 is only processing samples belonging to the stereo stream that will be recorded by the application.

The present invention thus also provides efficient hardware playthrough support. By steering the input channel map to an output channel map on a channel-by-channel-basis, any channel can be played through directly in the driver. Custom channel-steering can also be performed by the present invention; a single channel can be sent to all available channels by duplicating the same starting sample buffer pointer in channel map 108.

A Common Isochronous Packet (CIP packet) having an AM 824 format is contemplated for use with an embodiment of the present invention utilizing an IEEE 1394 High Performance Serial Bus, but other packet formats can be used as well. Directing attention to FIG. 2, the organization of exemplary CIP packet 200 is shown. CIP packet 200 has two headers, header 202 and 204. Following headers 202, 204 are various audio samples, packed in numerical order from left to right, top to bottom. As illustrated in FIG. 2, CIP packet 200 is divided into sample frames. Sample frame 206 comprises samples 1 through 6. Next is sample frame 208, comprising audio samples 7-12. This 6-sample frame size continues for additional sample frames until the end of CIP packet 200. Typically, there are eight sample frames in one CIP packet. However, other packet configurations can be used in embodiments of the present invention.

Directing attention to FIG. 3, steering table 106 describes an indexed channel order of 1, 3, 5, 2, 4, 6 for each 6-channel sample frame in CIP packet 200. This means that the first sample is processed in the sample frame, followed by the third sample, the fifth sample, the second sample, the fourth sample, and the sixth sample. This indexed order can be provided in a device descriptor passed from device 102 to system 100. In an alternative embodiment, the indexed order can be supplied during execution to audio system 100 by an application program interface (API) or other software executing on audio subsystem 100. This is especially useful when different devices are connected to audio subsystem 100, and packet processing shifts from one device to another.

Figure 5:
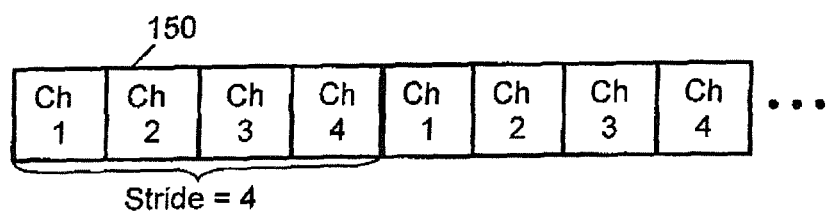

FIGS. 4 and 5 illustrate sample buffer 150 having different stride sizes as used in accordance with stride map 110. In each case, the address offset can be obtained from the pointer to sample buffer 150. FIG. 4 shows sample buffer 150 as a two-channel sample buffer used for a stereo audio stream, having a left channel and a right channel. In this example, the stride size is two, as the samples alternate between left and right, so one sample is skipped for example, when reading or writing the left channel or the right channel. Similarly, FIG. 5 illustrates sample buffer 150 as four-channel sample buffer, where the stride size is four, as the samples repeat a four-element sequence. In this case, to read channel 1, three samples are skipped after each time the sample for channel 1 is read. Thus, the stride size indicates the number of samples to skip in a sample buffer. In FIG. 4, where the stride size is two, two samples are skipped to reach the desired channel, and, in FIG. 5, where the stride size is four, four samples are skipped.

Figures 6, 7:
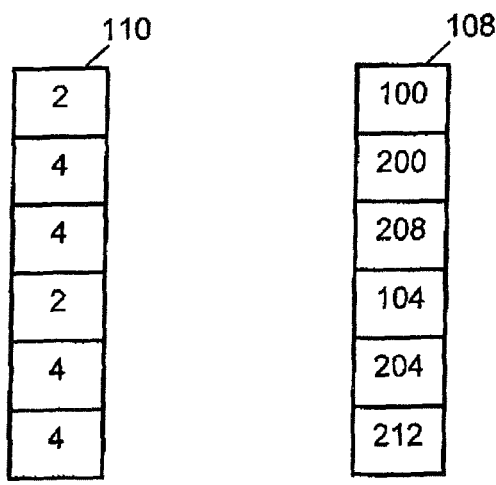
FIG. 6 illustrates the organization of a stride map array used in accordance with the present invention.
FIG. 7 illustrates the organization of a channel map used in accordance with the present invention.

FIG. 6 illustrates stride map 110, which is an array of stride sizes for sample buffers used in embodiments of the present invention. As shown, the first exemplary element indicates a stride size of two, and corresponds to a sample buffer as shown in FIG. 4. The next two elements each have a stride size of four, followed by a stride size of two and additional elements having stride sizes of four.

FIG. 7 illustrates channel map 108, which is an array of pointers that constitute the starting addresses of the individual sample buffers in audio channel buffers 112. As shown, the first element of channel map 108 has a pointer having the value 100, which indicates a starting address of 100. The next element is a pointer having the value 200. The third pointer has a value 208, followed by a pointer having the value 104, a pointer having the value 204 and another pointer having the value 212.

Audio subsystem 100 initializes by obtaining the channel order and number of channels to process. As described earlier, this information can be obtained by driver 104 from device 102 in the form of a device descriptor passed from device 102 to driver 104. Also as described above, this information can be passed to driver 104 from a process executing on audio subsystem 100, such as an API or other process. In an embodiment, such information could be passed to driver 104 when a user manipulates a device interface, such as an interface that allows the user to select from a plurality of devices connected to audio subsystem 100. Such information also could be passed to driver 104 when a user selects a particular operating mode of a connected audio device, such as an operating mode that requires a change in the amount of data processed by audio subsystem 100. For example, if a user wishes to change from four-channel audio to stereo audio, channel information sent to driver 104 would also change to reflect the change in operating mode.

At act 302, driver 104 uses the information received in act 300 to construct steering table 106, channel map 108, and stride map 110. Channel order information is reflected in steering table 106, number of channels is reflected in stride map 110, and assignment of audio sample streams is made to audio channel buffers 112 in channel map 108.

Figure 8:
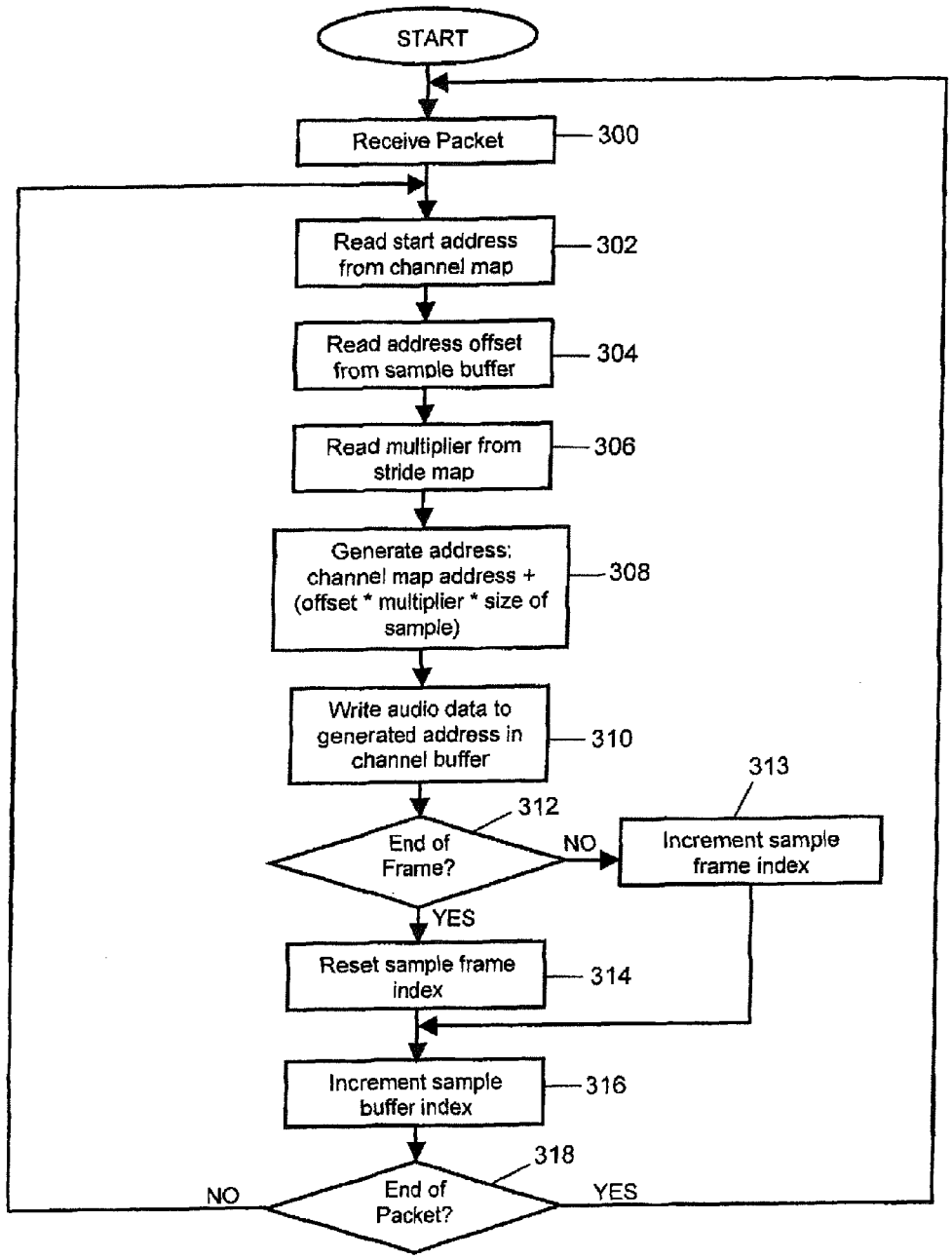
FIG. 8 illustrates the organization of audio channel buffers used in accordance with the present invention.

Operation of the present invention in a depacketizing embodiment is illustrated in flow diagram form as shown in FIG. 8. Beginning at act 300, initialization having already been performed on driver 104, a packet is received at audio subsystem 100. Driver 104 obtains the starting address from channel map 108 based on the sample frame index supplied by steering table 106 (which channel in the frame is being processed) in act 302. At act 304, driver 104 reads the sample buffer index, indicating which sample in main sample buffer 150. At act 306, device driver 104 reads the stride size from stride map 110. At act 308, an address within audio channel buffers 112 is calculated as the starting address of the channel read in act 302 plus the product of the offset value read in act 304 multiplied by the value read from stride map 110 in act 306 multiplied by the size of the sample.

At act 310, the audio data read from the packet is then written in audio channel buffers 112 at the address generated in act 308. If the end of a frame has not been reached (decision act 312), control proceeds to act 313, where the sample frame index is incremented. If the end of a frame has been reached, control transitions to act 314, where the sample frame index is reset and the sample buffer index is incremented (act 316). At decision act 318, if the end of a packet being processed has been reached, control transitions back to act 300 where processing of a new packet begins. If the end of the packet has not been reached, then control transitions back to act 302, where processing advances on the current packet. This sequence of acts repeats until there are no more additional packets to be processed.

Figure 9:
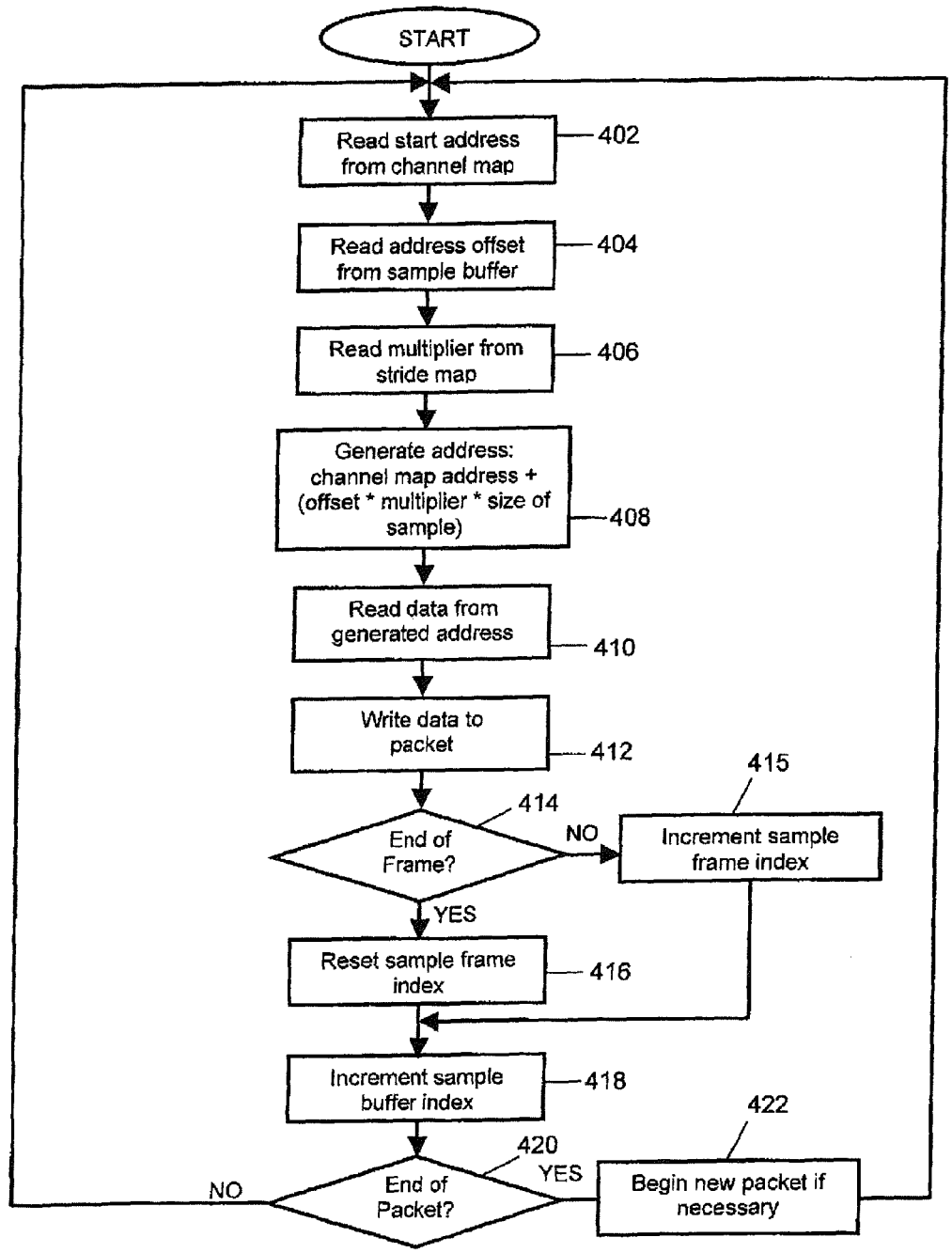
FIG. 9 illustrates in flow diagram form a sequence of acts performed in accordance with the present invention.

FIG. 9 illustrates a sequence of acts performed when driver 104 is applied as a packetizing function on data stored in audio channel buffers. Rather than receiving packets, as shown in FIG. 8, packets are being constructed and transmitted to device 102. Directing attention to FIG. 9, initialization having already been performed on device driver 104, in preparation for sending data stored in audio channel buffers 112, obtains the starting address from channel map 108 based on the sample frame index supplied by steering table 106 (which channel in the frame is being processed) in act 402. At act 404, driver 104 reads the sample buffer index, indicating which sample in main sample buffer 150. At act 406, driver 104 reads the stride size from stride map 110. At act 408, an address within audio channel buffers 112 is calculated as the starting address read in act 40 plus the product of the offset value read in act 404 multiplied by the value read from stride map 110 in act 306.

At act 410, audio data is read from audio channels buffer 112 at the address generated in act 408. This data is then written to a packet formed by driver 104 in act 412. If the end of a frame has not been reached (decision act 414), control proceeds to act 415, where the sample frame index is incremented. If the end of a frame has been reached, control transitions to act 416, where the sample frame index is reset and the sample buffer index is incremented (act 418). At decision act 420, if the end of a packet being processed has been reached, control transitions to act 422, where a new packet is begun and control loops back to act 402 where processing of the new packet begins. If the end of the packet has not been reached, then control still transitions back to act 402, where processing advances on the current packet. This sequence of acts repeats until there are no more additional packets to be processed. The constructed packets are then sent to device 102.

Combining the functionality of FIGS. 8 and 9 into a single driver 104 allows audio subsystem 100 to operate in playthrough mode. Referring back to FIG. I, in this embodiment, there are two channel maps 108-1 and 108-2. Channel map 108-1 is designated for input as described with respect to FIG. 8 and channel map 108-2 is designated for output as described with respect to FIG. 9. By steering channel map 108-1 to channel map 108-2 on a channel-by-channel basis, the audio data received from device 102 can be played through any channel in driver 104 to device 103.

While the present invention has been described and illustrated in detail, it is to be understood that many changes and modifications can be made to the various embodiments of the invention without departing from the spirit thereof.

What is claimed is:

1. A method for providing support for at least one media device driver, the method comprising:
   obtaining a channel order and a number of channels to process; and
   based at least in part on the obtained channel order and the number of channels to process, determining:
      a first element indicating the channel order, the channel order describing an order of packed data channels within frames of data;
      a second element indicating at least one parameter, the at least one parameter determining a number of data samples to skip, corresponding to others of the data channels, between sequential data samples of the same data channel; and
      a third element indicating one or more start addresses for the data channels.

2. The method of claim 1, wherein the first element, second element, and third element comprise a steering table, stride map, and channel map, respectively.

3. The method of claim 2, wherein the one or more start addresses reside within a sample buffer.

4. The method of claim 1, wherein the one or more start addresses reside within a sample buffer.

5. The method of claim 2, further comprising publishing the determined steering table, stride map, and channel map to the at least on media device driver.

6. The method of claim 5, wherein the act of publishing the steering table, the stride map, and the channel map substantially offloads processing from the at least one media device driver, thereby enhancing its efficiency.

7. The method of claim 1, wherein the channel order and number of channels to process are obtained upon detecting a user selecting a mode of operation for the at least one media device driver.

8. The method of claim 2, wherein the channel map is further configured to accommodate a mismatched sample size or packet size with respect to an application stream size.

9. An apparatus for processing frames of data comprising a plurality of data channels, each data channel comprising a plurality of sequential data samples, the data channels disposed within the frames of data, the apparatus comprising:
   a first interface configured to receive packetized data comprising at least frames of data;
   a sample buffer configured for of storage of one or more of the frames of data; and
   a computer readable apparatus comprising media non-transitory storage comprising a plurality of instructions, the plurality of instructions which are configured to, when executed, cause the apparatus to:
      receive information enabling unpacking of the frames of data;
      read one or more of the frames of data in the sample buffer;
      unpack the read one or more frames of data into a first set of data channels based at least in part on the information; and
      publish a second set of data channels to at least one audio device driver.

10. The apparatus of claim 9, wherein the at least one audio device driver processes only the published second set of data channels.

11. The apparatus of claim 9, wherein the packetized data further comprises a device descriptor; and
   wherein the information enabling unpacking of the frames is based at least in part on the device descriptor.

12. The apparatus of claim 9, wherein the information enabling unpacking of the frames comprises information received via an application programming interface (API).

13. The apparatus of claim 9, wherein each data channel comprises one or more Common Isochronous Packets (CIP).

14. The apparatus of claim 9, wherein the first interface comprises an interface to an IEEE Std. 1394-compliant bus.

15. The apparatus of claim 9, wherein the first interface comprises an interface to a-Universal Serial Bus (USB)-compliant bus.

16. The apparatus of claim 9, further comprising a second interface configured to transmit the second set of data channels to at least one second device.

17. The apparatus of claim 16, wherein the at least one audio device driver is resident within the at least one other second device.

18. The apparatus of claim 9, wherein the at least one audio device driver is local to the apparatus.

19. A method for processing data samples for at least one media device driver, the method comprising:
- obtaining information enabling unpacking of frames of data stored in a buffer;
- reading one or more of the frames of data in the buffer;
- unpacking the read one or more frames into a first set of data channels based at least in part on the obtained information;
- packing a second set of data channels from the first set of data channels based at least in part on the obtained information; and
- publishing the second set of data channels to at least one media device driver;
- wherein the at least one media device driver processes only the published second set of data channels.

20. The method of claim 19, wherein the information enabling unpacking of frames of data comprises a device descriptor associated with the frames of data stored in the buffer.

21. The method of claim 19, wherein the information enabling unpacking of frames of data is received from a process executing on an audio subsystem via an application programming interface (API).

22. The method of claim 21, wherein the information enabling unpacking of frames of data is generated when a change of a configuration of the audio subsystem is detected.

23. The method of claim 22, wherein the detected change of the configuration comprises a change in a number of audio channels operating in the audio subsystem.

24. The method of claim 19, wherein the publishing of the second set of data channels offloads processing from the at least one media device driver.

* * * * *